Patented Oct. 3, 1950

2,524,422

UNITED STATES PATENT OFFICE 2,524,422

METHOD OF PREPARING ORGANIC ACIDS

James H. Boothe and Robert B. Angier, Pearl River, N. Y., assignors to American Cyanamid Company, New York, N. Y., a corporation of Maine No Drawing. Application January 14, 1948, Serial No. 2,334

6 Claims. (Cl. 260—112)

This invention relates to a process for the preparation of polypeptides. More particularly, it relates to a method of preparing polypeptides having a predetermined spacial arrangement.

Pteroylglutamic acid, commonly called folic acid, has been widely described in medical literature because of its activity in the treatment of anemias, sprue and other diseases of the circulatory system. Recent publications indicate that derivatives of pteroylglutamic acid such as pteroylglutamic acid polypeptides have biological activity. The activity in many cases depends upon the configuration of the polypeptide portion of the molecule.

It has therefore been found highly desirable to have a method of preparing peptides of polycarboxylic amino acids having a definite predetermined spacial arrangement.

The polycarboxylic amino acids found useful in preparing peptides of the present invention are amino malonic acid, aspartic acid, glutamic acid, hydroxyglutamic acid, alpha-amino adipic acid, alpha-amino pimelic acid, etc. The preferred amino acid is glutamic acid. In general, the structure of the peptide has a direct effect on the activity of the peptide.

Applicants have found that these peptides can be prepared by reacting a mono ester of a polycarboxylic amino acid, such as those above, on which the amino group has been protected, with hydrazine to form the hydrazide. The hydrazide is then reacted with nitrous acid to form the corresponding azide. The azide is treated with a mono ester of a polycarboxylic amino acid and the process repeated to give the desired polypeptide.

The general reaction which takes place in the preparation of a peptide by the method of the present invention can be illustrated by the following equations:

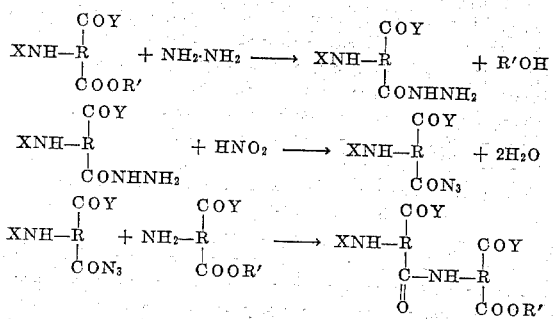

in which X is a blocking group such as acyl, carbobenzoxy, p-nitrobenzoyl, and the like, Y is a member of the group consisting of hydroxyl, amino, alkali metal radicals, etc., R is an alkylene or hydroxyalkylene radical and R' is an alkyl radical.

In carrying out the reaction the amino group can be protected by such groups as (X of general equation) carbobenzoxy, p-nitrobenzoyl, acetyl propionyl, butyryl, nicotinyl, and the like. The preferred protective group is the p-nitrobenzoyl since this can be reduced to the p-aminobenzoyl which in turn when reacted with 2,3-dibromopropionaldehyde or other suitable intermediates and 2,4,5-triamino-6-hydroxypyrimidine forms polypeptides of pteroylglutamic acid.

In addition to the protected amino group and the mono ester group, R' of general equation, the starting polycarboxylic amino acids may have free carboxylic acid radicals, an amide group, alkali metal salts of carboxylic acid groups and the like as indicated by COY in the general equations.

In dicarboxylic amino acids there are two possible configurations for a dipeptide. In the case of glutamic acid they are alpha-glutamylglutamic acid and gamma-glutamylglutamic acid. In the tripeptide of glutamic acid there are five configurations. They are gamma-glutamyl-gamma-glutamylglutamic acid; alpha,-gamma - glutamyldiglutamic acid; alpha - glutamyl-gamma-glutamylglutamic acid; alpha-glutamyl - alpha - glutamylglutamic acid; and gamma-glutamyl-alpha-glutamylglutamic acid. In the case of still higher polypeptides the number of possible isomers becomes progressively higher but follows the same general pattern.

This method is particularly useful in preparing the gamma peptide of glutamic acid since the gamma-carboxylic acid group of an acid such as glutamic acid appears to be more reactive than the alpha group. The more important compounds of the present invention are those having a configuration corresponding to the dipeptide gamma configuration or the tripeptide gamma,-gamma configuration of glutamic acid, because of the aforementioned biological activity when constituted as pteroylglutamic acid derivatives.

In carrying out the reaction the hydrazide of the amino acid is prepared by reacting the mono ester of the acid with hydrazine hydrate, hydrazine sulfate or anhydrous hydrazine. The reaction temperature is maintained at about 0° C. to about 100° C. The reaction preferably takes place in the presence of a solvent such as water, ethanol, methanol and the like or an excess of hydrazine. In forming the hydrazide of a dipeptide mono ester it is usually desirable to use an organic solvent and to raise the temperature of the reaction mixture to the refluxing temperature of the solvent.

In forming the azide of a mono hydrazide of a polycarboxylic amino acid, having the amino group protected, a temperature of −10° C. to 15° C. is used. A solvent such as water containing a small amount of a strong acid such as hydrochloric, sulfuric, phosphoric is used.

After obtaining the azide this can be reacted with an amino acid, an esterified amino acid, and the like. However, if it is desirable to further lengthen the polypeptide chain, it would be appropriate to use a monoester of the amino acid so the above outlined process can be repeated. In carrying out this reaction a temperature of 0° C. to 60° C. or higher can be used. The preferred range however is from about 20° C. to about 40° C.

The following examples show the preparation of di- and tri-peptides of polycarboxylic amino acids. It is to be understood, however, that higher polypeptides can be prepared by similar methods.

Example 1

100.0 g. of 1-2-pyrrolidone-5-carboxamide was suspended in 650–700 cc. of stock absolute ethanol containing 37.5 g. of dry HCl. This was refluxed for thirty minutes and then filtered hot to remove the ammonium chloride which had crystallized out. The filtrate was well cooled, the crystalline product filtered off, washed with ethanol and ether and dried. A yield of 50.0 g. of the hydrochloride of gamma-carbethoxy-alpha-aminobutyramide was obtained having a melting point of 193°–194° C.

To 30.0 g. of the compound obtained above was added a solution of 400 cc. of ethyl acetate and 40 cc. of triethylamine. This was shaken or stirred until most of the small lumps had reacted. The triethylamine hydrochloride was then filtered off and 30.0 g. of p-nitrobenzoyl chloride was added to the filtrate. The resulting reaction was slightly exothermic and a precipitate formed immediately. After standing two hours at room temperature and two hours at 5° C. the solid was filtered off and washed with ethyl acetate. It was then washed thoroughly several times with water to remove the p-nitrobenzoyl chloride-triethylamine reaction product and then washed with methanol and ether and dried. A yield of 39.5 g. (85%); of alpha-(p-nitrobenzoylamino)-gamma-carbethoxy butyramide (ethyl p-nitrobenzoylisoglutaminate) was obtained having a melting point 172°–178° C.

14.0 g. of ethyl p-nitrobenzoylisoglutaminate obtained above was suspended in 80 cc. of 100% hydrazine hydrate and stirred until the solid had slowly dissolved and then crystallized again to form a thick paste. This stood five minutes more and then 25 cc. of ethanol was added. This was shaken fifteen minutes and another 50 cc. of ethanol was added. The mixture was cooled four hours at 2°–4° C., filtered, washed with ethanol and ether and dried; yield 9.2 g. This was recrystallized from 60 cc. of water. A yield of 7.7 g. (57%) of p-nitrobenzoylisoglutamine-gamma-hydrazide was obtained. It was insoluble in cold water but soluble in cold aqueous HCl.

8.0 g. of p-nitrobenzoylisoglutamine-gamma-hydrazide was suspended in a mixture of 80 cc. of water and 20 cc of ethyl acetate in a 250 cc. flask. This was placed in an ice bath, stirred and 12 cc. of conc. HCl added. Then at about 5° C. and with vigorous stirring a solution of 1.8 g. of sodium nitrite in 7 cc. of water was added dropwise and slowly. The azide began to crystallize out during the reaction. The mixture was stirred for about twenty minutes after the addition of sodium nitrite was complete. It was then filtered, washed with water and once with a little ether and air-dried a short time. A yield 7.5 g.–8.0 g. of p-nitrobenzoylisoglutamine-gamma-azide, a crystalline white solid, was obtained.

The azide prepared from 2.7 g. of p-nitrobenzoylisoglutamine-gamma-hydrazide as described above was suspended and partially dissolved in 75 cc. of ethyl acetate. Then an excess of diethyl glutamate (about 8 cc.) was added and the mixture shaken. The azide dissolved and after a short time the product crystallized out. After standing ninety minutes at room temperature and one hour at 5° C. it was filtered, washed with ethyl acetate and ether and dried; yield 2.5 g. (62%). 2.3 g. of this product was recrystallized from a solution of 325 cc. of water and 25 cc. of ethanol. The product, diethyl p-nitrobenzoylisoglutaminylglutamate crystallized in fine white needles. It was recrystallized again from 120 cc. of absolute ethanol; yield 1.2 g.; fine hair-like crystals; M. P. 189°–190° C.

$[\alpha]_D^{25°} = +8.75°$ (2% solution in glacial acetic acid).

Example 2

To 11.0 g. of ethyl isoglutaminate hydrochloride suspended in 200 cc. of ethyl acetate was added 16 cc. of triethylamine. This was stirred and mixed well to insure complete reaction. The triethylamine hydrochloride was then filtered off and to the resulting filtrate was added the azide prepared from 8.0 g. of p-nitrobenzoylisoglutamine-gamma-hydrazide as described in Example 1. The mixture was stirred and the azide dissolved with the production of an intense purple color. Within a short time a crystalline product began to appear and the color faded. This stood at room temperature for ninety minutes and at 5° C. for two to three hours. It was filtered, washed with ethyl acetate and ether and dried. The product (about 9.5 g.) was allowed to recrystallize after heating with 550 cc. of water and activated charcoal and filtering. A yield of 6.3 g. (54%) of ethyl p-nitrobenzoylisoglutaminylisoglutaminate was obtained. Some of this was recrystallized again from water. It crystallizes in gleaming white triangular platelets, having a melting point of 217°–218° C.

$[\alpha]_D^{28°} = +8.5°$ (2% solution in glacial acetic acid).

Example 3

To 7.6 g. of triethyl gamma-glutamylglutamate hydrochloride suspended in 75 cc. of ethyl acetate was added 6 cc. of triethylamine. This was stirred for about fifteen minutes and then the triethylamine hydrochloride was filtered off. To the filtrate was added the azide prepared from 3.0 g. of p-nitrobenzoylisoglutamine-gamma-hydrazide as described in Example 1. The azide dissolved rather slowly and after a short time a gelatinous precipitate began to appear. After shaking for thirty minutes and standing at room temperature for two hours it was cooled to 2°–4° C. overnight, then filtered, washed with ethyl acetate and ether and dried. 3.0 g. of this material was dissolved in 20 cc. of glacial acetic acid, heated with activated charcoal and filtered. 100 cc. of cold water was added slowly and after cooling several hours the resulting solid was filtered, washed with water, ethanol and ether and dried. It was then recrystallized from 15 cc. of glacial acetic acid. Yield 1.1 g. of the triethyl ester of p-nitrobenzoylisoglutaminyl-gamma-glutamylglutamic acid having a melting point of 189°–190° C.

$[\alpha]_D^{27°} = +4.5°$ (2% solution in glacial acetic acid).

Example 4

To 2.116 g. gamma-ethyl glutamate hydrochloride was added with stirring 30 cc. water and 5 g. NaHCO₃. Then 2 g. para-nitrobenzoyl chloride was added and stirring was continued for 2.5 hours. A deep violet color developed which faded somewhat at the end of 2.5 hours. The solution was filtered and acidified to below pH 2. An oily material separated which soon solidified to a white crystalline solid. This was filtered off and dried. The product gamma-ethyl para-nitrobenzoylglutamate was crystallized from 60–70° cc. benzene, and had a melting point of 112°–114° C.

The gamma-ethyl para-nitrobenzoylglutamate was a wet cake (weighing 38.3 kg. representing 22.35 kg. of dry material) was added slowly to a mixture of 5.85 kg. of sodium bicarbonate in 5.5 liters of water. When solution was completed it was filtered. The filtrate (40–45 liters) was reacted with 4.24 liters of hydrazine hydrate overnight (9 hours) at 30° C. This solution was then diluted to 100 liters, neutralized quickly to pH 1.3 using 30 lbs. of concentrated hydrochloric acid. The para-nitrobenzoic acid was filtered off. The filtrate was diluted to 250 liters and brought to pH 3.12 using ammonium hydroxide. After chilling to 0° C. by adding chopped ice to the reaction mixture, the product was collected and washed. The product, gamma-hydrazide of para-nitrobenzoylglutamic acid weighed 13.9 kg.

The wet cake of the gamma-hydrazide of para-nitrobenzoylglutamic acid (wet weight 43.2 kg. representing 13.9 kg. of dry weight) was dissolved in 140 liters of water and 52 lbs. of concentrated hydrochloric acid. Sixty liters of ethyl acetate was then added. This mixture was chilled to 0° C. and kept at this temperature by adding chopped ice while a solution of 4.4 kg. of sodium nitrite in 15 liters of water was added slowly with stirring. The mixture was stirred for fifteen minutes and allowed to stand for 1 hour. The ethyl acetate was drawn off the bottom (sp. gr. greater than water with the azide dissolved). The water layer was washed twice with 2–20 liter portions of ethyl acetate. The combined ethyl acetate layer and two washes were mixed with a solution of 22.3 lbs. of gamma-ethyl glutamate and 10 kg. of sodium bicarbonate in 100 liters of water. This mixture stood overnight (14 hours) at 20°–40° C. The aqueous layer was separated off, acidified to pH 1.25 using about 36 lbs. of concentrated hydrochloric acid and chilled to 0° C. to −4° C. by adding chopped ice. The product, gamma-ethyl para-nitrobenzoyl - gamma - glutamylglutamate, was collected and washed. A yield of 13.3 kg. was obtained.

Example 5

To 13.4 kg. of gamma-ethyl para-nitrobenzoyl-gamma-glutamylglutamate (obtained in Example 4) dissolved in 45 liters of ethanol and 23 liters of water was added 7.5 kg. of sodium bicarbonate. The solution was warmed to 35° C., filtered, and diluted to 225 liters using ethanol. A seed crystal was then added. Crystallization took place rapidly and the mixture became almost solid. The mixture was diluted with 50 liters of ethanol, slurried and filtered. The product was washed with 50 liters of ethanol. The wet cake weighed 23 kg. representing 12.6 kg. of dry product.

This wet cake was spread and air dried for 24 hours. It was then dried in high vacuum at room temperature for 12 hours. The dried di-sodium gamma - ethyl - nitrobenzoyl - gamma-glutamylglutamate weighed 13 kg.

A sample of this sodium salt was converted to gamma - ethyl - para - nitrobenzoyl-gamma-glutamylglutamic acid, and dried; melting point 136° C.

The dry disodium gamma-ethyl para-nitrobenzoyl-gamma-glutamylglutamate (13 kg.) was dissolved in 20 liters of anhydrous methanol and 3.5 liters of hydrazine hydrate. This solution was refluxed for 1½ hours, cooled, filtered, and run into 80 liters of ethanol. The precipitated disodium salt was filtered off and washed with 40 liters of ether and press cake was blown dry with nitrogen. This cake absorbed moisture from the air and became gummy so no weight was taken.

The crude, unweighed, wet cake of the disodium gamma-hydrazide para-nitrobenzoyl-gamma-glutamylglutamate obtained above was dissolved in 40 liters of water, 15.5 liters of concentrated hydrochloric acid and 40 liters of ethyl acetate. After stirring and separating the two layers the ethyl acetate layer was discarded. The water layer and 49 liters of ethyl acetate were mixed, chilled to 0° C. by adding chopped ice, and kept at 0° C. by adding chopped ice as needed while a solution of 2.27 (5 lbs.) kg. of sodium nitrite in 10 liters of water was added slowly. The mixture was then stirred for 20 minutes more. The ethyl acetate layer was separated off. The aqueous layer was washed twice with 2–20 liter portions of ethyl acetate. The ethyl acetate layer and the two ethyl acetate washes were combined and washed with 30 liters of water. This washed ethyl acetate solution of the azide was mixed with a solution of 9.12 kg. of gamma-ethyl glutamate and 8.95 kg. of sodium bicarbonate in 60 liters of water. This mixture was allowed to react at 30° C. for 14 hours. The ethyl acetate layer was separated and washed with 20 liters of water. This aqueous wash and the aqueous layer were combined and acidified with 20 lbs. of concentrated hydrochloric acid using enough ice to keep a temperature of about 18° C. After stirring for 20 minutes the crystallization proceeded rapidly. The mixture was then acidified further using a total of 30 lbs. of concentrated hydrochloric acid (this was an excess since the pH dropped below 1). The product was collected and washed with water. The wet cake weighed 24.5 kg. representing 6.96 kg. of dried material. This material was crystallized by dissolving the above wet cake in 35 liters of ethanol at 35° C., treating with 2 kg. of charcoal, filtering, and diluting to 130 liters with water at 30° C. Crystallization proceeded smoothly as the solution was cooled at 15° C. with cold water externally. Finally enough chopped ice was added to the mixture until a temperature of 1° C. and a volume of 175 liters resulted. The product was collected and washed. The wet cake weighed 12.36 kg. representing 6.26 kg. of gamma-ethyl para-nitrobenzoyl-gamma-glutamyl - gamma-glutamylglutamate. The dried sample melted at 157° to 167° C.

The nitro compound described above may be converted to the corresponding amino compound by reduction in accordance with the following procedure.

Example 6

The gamma-ethyl para-nitrobenzoyl-gamma-glutamyl-gamma-glutamyl-glutamate as a partial dried cake representing 6.25 kg. of dry material (obtained above in Example 5) was suspended in 43 liters of water. This suspension was adjusted to pH 3.5 and maintained at this pH by adding hydrochloric acid while the nitro group was reduced. Chopped ice was added as needed to keep the temperature at 30° C. The nitro group was reduced by adding a suspension of zinc-copper dust in 23.5 liters of water fairly rapidly. The zinc-copper dust suspension was prepared by adding all at once a solution of 350 grams of copper acetate in 3.5 liters of water to a suspension of 3.5 kg. of zinc dust in 10 liters of water. Ten liters of water was used in completing the transfer of the zinc-copper dust. A Bratton-Marshall amine determination showed 93.5% reduction of the nitro to an amine group indicating that the product obtained was gamma-ethyl para-aminobenzoyl-gamma-glutamyl-gamma-glutamylglutamate.

Example 7

350 cc. water, 200 cc. ether, 29.6 g. gamma-ethyl glutamate hydrochloride and 17.0 g. MgO were stirred and cooled while 40.78 g. carbobenzoxy chloride (benzyl chlorocarbonate) was added over about 15 minutes. The cooling bath was removed and the mixture stirred for 5 hours at room temperature. The mixture was cooled again in ice and added 70 cc. concentrated HCl. The ether layer was separated off and the water washed with more ether. The combined ether solutions were washed with 0.2 N HCl and 3 times with water. The product was then extracted out of the ether with 2–100 cc. portions of 1 N NaHCO₃. After heating with activated charcoal and filtering the water solution was acidified and an oily product separated. On cooling, the product gamma-ethyl carbobenzoxyglutamate solidified and was filtered off.

48 g. gamma-ethyl carbobenzoxyglutamate was dissolved in 70 cc. ethanol and 48 cc. hydrazine hydrate was added. The solution warms up moderately. It was allowed to stand at room temperature overnight and was then diluted with 350 cc. water and neutralized to pH 3 with concentrated HCl. The product carbobenzoxyglutamic acid gamma-hydrazide crystallized out and after cooling 2 hours it was filtered out and dried, wt.—42.3 g.

50 g. carbobenzoxyglutamic acid gamma-hydrazide was stirred in 500 cc. ice cold water and 75 cc. concentrated HCl was added which dissolved the hydrazide. 200 cc. ethyl acetate was added and while keeping the temperature at 2°–4° C., 17.5 g. sodium nitrite in 50 cc. water was added dropwise. The solution was stirred 15 minutes more and the ethyl acetate layer was separated. The water was extracted with 100 cc. ethyl acetate and the combined ethyl acetate solutions were extracted 3 times with ice water. The ethyl acetate solution was dried over MgSO₄ while keeping cold and then mixed with 100 g. diethyl glutamate in 200 cc. ethyl acetate. A gas is evolved for several hours. The solution was allowed to stand overnight. The ethyl acetate solution was extracted with 5–200 cc. portions of 0.5 N HCl and twice with water. The product was then extracted out with 200 cc. and 100 cc. 1 N NaHCO₃ solution. Upon acidification an oil is precipitated which was drawn off. The water was extracted with 100 cc. ethyl acetate which was added to the oily product. After drying over MgSO₄ the ethyl acetate was evaporated off. The residual thick oil weighed about 70 g. The carbobenzoxy-gamma-glutamyl-glutamic acid diethyl ester solidified to a waxy consistency.

When desirable the carbobenzoxy group of the above compound can be replaced by a p-nitrobenzoyl group in accordance with the following procedure.

Example 8

5 g. carbobenzoxy-gamma-glutamylglutamic acid diethyl ester was dissolved in 40 cc. alcohol, 10 cc. water, and 2 cc. acetic acid. 0.3 g. 10% palladium on carbon catalyst was added and hydrogen was bubbled through with good stirring. The exit gases were bubbled through sodium hydroxide solution to collect the CO₂ evolved. After reducing for 2 hours another 0.3 g. palladium on carbon catalyst was added and reduced until CO₂ stopped being given off. The CO₂ was precipitated as BaCO₃. The palladium on carbon catalyst was filtered out and the solution evaporated to dryness in vacuum. The residue which was a viscous oil was dissolved in 7 cc. water and 18 cc. 2 N-sodium hydroxide was added. With stirring 3.62 g. p-nitrobenzoyl chloride and 17 cc. 2 N-sodium hydroxide were added concurrently over 10 minutes and stirring was continued 15 minutes more. 4.25 cc. of concentrated hydrochloric acid was added and the p-nitrobenzoic acid was filtered out. The filtrate was cooled in ice and scratched and slowly deposited white crystals. The crystals of p-nitrobenzoyl-gamma-glutamylglutamic acid were filtered off and dried. They weighed 1.0 g. and had a melting point of 183°–185° C. The melting point was not depressed when mixed with a sample of this material prepared by another method.

Example 9

618 g. of carbobenzoxyglutamic acid gamma-hydrazide prepared as in Example 7, was dissolved in a mixture of 6 liters of water, 1500 cc. of ethyl acetate and 900 cc. of concentrated hydrochloric acid. To this solution, after chilling to 0° C., was added 216 g. of sodium nitrite dissolved in 600 cc. of water slowly with cooling to keep temperature below 5° C. The mixture was stirred for half an hour after completing the addition of the nitrite solution. Nine hundred cc. of ether was then added and the ethyl acetate-ether layer drawn off. The aqueous layer was washed with 1200 cc. of ethyl acetate. The combined ethyl acetate-ether layer and the ethyl acetate wash was reacted with a mixture of 880 g. of sodium bicarbonate, 632 g. of diethyl glutamate and 3500 cc. of water overnight. The aqueous layer was drawn off, extracted with 1 liter of ether and freed of ether by vacuum. After noriting, the solution was acidified strongly (pH about 1). The oily product was collected. The water was extracted with 1 liter of ethyl acetate. The ethyl acetate extract and the oily product were combined and dried with magnesium sulfate. The ethyl acetate was distilled off under vacuum. The oily carbobenzoxy-gamma-glutamylglutamic acid diethyl ester weighed 806 g.

Example 10

A wet cake weighing 4.32 kg. representing 1.21 kg. of p-nitrobenzoylglutamic acid gamma-hydrazide was dissolved in 10 liters of water and 1 liter of concentrated hydrochloric acid. This clear solution was cooled to 0° C. and kept below 2° C. by adding chopped ice while adding with stirring a solution of 413 g. of sodium nitrite dissolved in 1.5 liters of water. A gummy cake of p-nitrobenzoylglutamic acid gamma-azide was formed. This cake was washed with ice water and then reacted overnight at 30° C. with a solution of 1 kg. of gamma-ethyl glutamate and 1 kg. of sodium bicarbonate dissolved in 10 liters of water. This solution was then cooled 0° C. and acidified to pH about 1 to cause the product to precipitate. It was collected, washed, and dried. The weight of the gamma-ethyl p-nitrobenzoyl-gamma-glutamylglutamate was 1240 g. The structural formula of the compound obtained in this example is as follows:

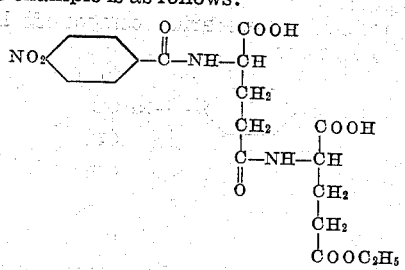

Example 11

22.5 g. gamma-ethyl p-nitrobenzoyl-gamma-glutamylglutamate was dissolved in 25 cc. water and 8.4 g. $NaHCO_3$. After the evolution of gas ceased the solution was filtered and diluted with 250 cc. of ethanol. On seeding and cooling the disodium salt of gamma-ethyl p-nitrobenzoyl-gamma-glutamylglutamate crystallized out and was filtered and dried. Wt.—14.5 g.

35 g. of the disodium salt of gamma-ethyl p-nitrobenzoyl - gamma-glutamylglutamate was dissolved in 70 cc. methanol and 10.5 cc. hydrazine hydrate. The solution was refluxed 1.5 hours and then cooled and filtered. The filtrate was stirred with 700 cc. ethanol and cooled for an hour. The precipitate was filtered off, washed with ethanol and ether, and dried. The disodium salt of gamma-hydrazide of p-nitrobenzoyl-gamma-glutamylglutamic acid was obtained. Wt. 30 g.

30 g. of the disodium salt of p-nitrobenzoyl-gamma-glutamylglutamic acid gamma-hydrazide was dissolved in 150 cc. water and 45 cc. concentrated HCl. This solution was washed with 2-150 cc. portions of ethyl acetate which were discarded. 150 cc. more ethyl acetate was added and the mixture cooled to 0° C. 6 g. sodium nitrite in 20 cc. water was dropped in slowly with stirring and cooling. After stirring an additional 15 minutes the ethyl acetate was removed and the water was washed with 2-75 cc. portions of ethyl acetate. The combined ethyl acetate solutions were washed with 2-100 cc. portions of water and were then added to 100 cc. of water containing 23.4 g. gamma-ethyl glutamate and 28 g. sodium bicarbonate. This mixture was stirred 3 hours after warming up to 30° C. The aqueous phase was drawn off and treated with charcoal and filtered. Upon slow acidification with HCl and cooling the product, gamma-ethyl p-nitrobenzoyl - gamma - glutamyl-gamma-glutamyl-glutamate precipitated as a solid and was filtered out and dried. Wt. 19.0 g. having a melting point of 168°–169° C. The structural formula of the compound obtained in this example is as follows:

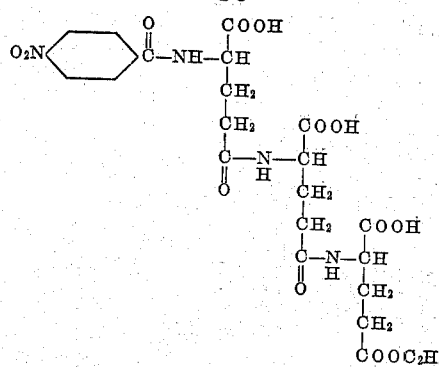

Example 12

A mixture of p-nitrobenzoyl glutamic acid gamma-hydrazide (99 g.) (as prepared in Example 4), water (965 cc.) concentrated hydrochloric acid (145 cc.) and ethyl acetate (725 cc.) was cooled to 0°, and then, with good stirring, a solution of sodium nitrite (33.8 g.) in 195 cc. of water was added during 15 minutes, the temperature being kept below 2° C. After stirring for an additional 20 minutes, the water layer was separated and extracted twice with ethyl acetate. The combined ethyl acetate solution was then extracted 3 times with 400 cc. portions of ice water. The ethyl acetate solution, containing the gamma-azide of p-nitrobenzoyl glutamic acid, was then added to a cold, well stirred solution of triethyl gamma-glutamyl glutamate hydrochloride (103 g.), and sodium bicarbonate (135 g.) in 500 cc. of water. After stirring for about 30 minutes the ice bath was removed and stirring was continued at room temperature for 5 hours. An additional 300 cc. of water was added during this period. After filtering the reaction mixture the ethyl acetate layer was separated and extracted with about 250 cc. of sodium bicarbonate solution and then with 200 cc. of water. The combined aqueous solutions were then extracted 3 times with ether and again filtered. On cooling, the sodium salt of the reaction product crystallized. The mixture was acidified with hydrochloric acid to pH 1.5, and the precipitate was collected on the filter, washed with water and dried. A yield of 85.5%, 142 g. of triethyl p-nitrobenzoyl-gamma-glutamyl-gamma - glutamylglutamate was obtained.

A sample of this material was recrystallized, first as the pyridine salt from ethanol, and then after acidification as the corresponding free acid from aqueous ethanol the product had a melting point of 152°–154° C. uncorr. (U. S. P. conditions.)

$[\alpha]_D^{29°} = -26.5$ (4% solution in .5 N $NaHCO_3$).

Example 13

15.0 g. of p-nitrobenzoylglutamic acid gamma-hydrazide, 100 cc. of ethyl acetate and 150 cc. of water were mixed and cooled in an ice bath and 22.5 cc. of concentrated HCl added. Then with cooling to 5° C. and with good stirring a solution of 5.25 g. of sodium nitrite in 25 cc. of water was added dropwise. After an additional 15 minutes stirring the layers were separated and the water layer extracted with 80 cc. of ethyl acetate. The combined ethyl acetate solutions were then extracted with two 70 cc. portions of water keeping it cold all the time. Sodium chloride was used to break emulsions. This solution was then added to a solution made by dissolving 15.0 g. of ethyl isoglutamine hydrochloride and 24.5 g. of sodium bicarbonate in 80 cc. of water. This was stirred vigorously for 2½ hours allowing the solution to come to room temperature. The two layers were separated and the water layer washed with ether. This water solution was then neutralized to pH 2-3 with HCl and an oil appeared. After standing overnight this became a gummy solid. The liquid was decanted and the solid dried in a desiccator until it was all solid. A yield of 15.5 g. of ethyl p-nitrobenzoyl-gamma-glutamylisoglutaminate was obtained. The crystalline pyridine salt of this compound had a melting point of 144°-147° C.

*Example 14*

To 8.0 g. of p-nitrobenzoylglutamic acid gamma-hydrazide suspended in a mixture of 80 cc. of water and 50 cc. of ethyl acetate and cooled in an ice bath was added 11 cc. of concentrated HCl. After cooling to 0° C., a solution of 2.0 g. of sodium nitrite in 10 cc. of water was added slowly with rapid stirring and at a temperature of 0° to 5° C. After 15 minutes stirring, the layers were separated and the water layer washed with ethyl acetate. The combined ethyl acetate layers were washed once with ice water and then added to a freshly prepared solution of 7.2 g. of ethyl glycinate hydrochloride and 13 g. of NaHCO3 in 60 cc. of water. This was stirred for three hours, the layers separated and the water layer washed with ethyl acetate. 4.0 g. of sodium nitrite was dissolved in this water solution and it was added slowly to a solution of 16 cc. of concentrated HCl and 30 cc. of water. The product separated as a syrup but solidified and crystallized quickly. After good cooling the solid was filtered off and dried. This was dissolved in 40 cc. of warm ethanol and filtered. A little water and a few drops of HCl were added, the solution was cooled in an ice bath and water was added slowly until the product began to crystallize. A total of 90 cc. of water was added. After cooling, it was filtered, washed and dried. A yield of 4.7 g. of ethyl p-nitrobenzoyl-gamma-glutamyl-glycinate was obtained, melting at 126°-128° C.

*Example 15*

100 g. of gamma-ethyl-glutamate and 150 g. of sodium bicarbonate was suspended in 700 ml. of water. This was cooled to 5° C. To this was added 765 ml. of an ethereal solution containing 145 g. of the gamma-azide of p-nitrobenzoyl glutamic acid. With stirring this mixture was warmed up to 24° C. and stirred until there was no more evolution of gas. The mixture was then cooled to near 0° C. and the ether layer separated and discarded. The water layer was made strongly acid with concentrated hydrochloric acid. A gummy pricipitate settled out which turned to solid with time. A yield of 197 g. of gamma-ethyl para-nitrobenzoyl-gamma-glutamylglutamate with a melting point of 137° C. was obtained.

*Example 16*

660 g. p-nitrobenzoylglutamic acid-gamma-hydrazide was dissolved in 4600 cc. water, 2.5 kg. of ice and 990 cc. concentrated hydrochloric acid. 3 liters ethyl acetate was added and while keeping the temperature at 0°-2° C., 220 g. sodium nitrite dissolved in water was dropped in with vigorous stirring. It was stirred 20 minutes additional and the ethyl acetate layer was siphoned off. The water was washed with 2, 1 liter portions of ethyl acetate. The combined ethyl acetate solutions were then added to a mixture of 625 g. of glutamic acid, 1200 g. sodium bicarbonate, and 3300 cc. water. This mixture was then stirred for 3-4 hours after warming up to room temperature. The water layer was separated and the ethyl acetate washed once with water. The combined water solutions were treated with charcoal and then acidified to pH 1.5. The product first oiled out and then solidified. It was filtered off and crystallized by dissolving in 2.5 liters boiling alcohol and then diluting to 15 liters with water. On cooling the product crystallized out. It was filtered off and air dried. The p-nitrobenzoyl-gamma-glutamylglutamic acid weighed 571 g. and had a melting point of 186°-187° C. No depression when mixed with material from a previously described preparation.

We claim:

1. A method of preparing compounds having the general formula:

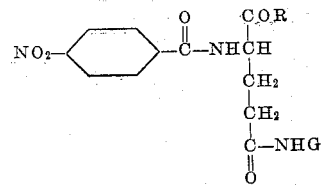

in which R is a member of the group consisting of hydroxyl, amino and alkali metal radicals, —NHG is a member of the group consisting of glutamic acid, its mono-esters, salts and glutamic acid amides, which comprises reacting a N-para-nitrobenzoylglutamic acid gamma-ester with hydrazine to form the corresponding gamma-hydrazide, reacting said hydrazide with nitrous acid to obtain the corresponding azide, reacting said azide with a member of the group consisting of glutamic acid, its mono esters, salts and glutamic acid amides in a substantially aqueous solvent and recovering said compound therefrom.

2. A method of preparing compounds having the general formula:

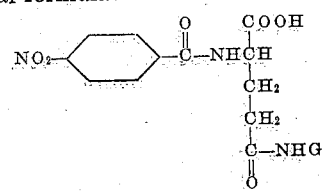

in which —NHG is a glutamic acid mono-ester, which comprises reacting a N-para-nitrobenzoyl-glutamic acid gamma-ester with hydrazine to form the corresponding gamma-hydrazide, reacting said hydrazide with nitrous acid to obtain the corresponding azide, reacting the said azide with a glutamic acid mono-ester in a substantially aqueous solvent and recovering the said compound therefrom.

3. A method of preparing compounds having the general formula:

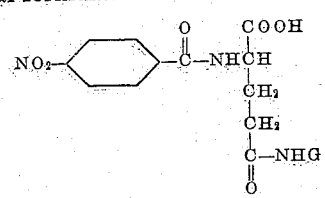

in which —NHG is a glutamylglutamic acid ester, which comprises reacting a N-para-nitrobenzoyl-glutamic acid gamma-ester with hydrazine to form the corresponding gamma-hydrazide, reacting said hydrazide with nitrous acid to form the corresponding azide, reacting said azide with a glutamyl-glutamic acid ester in a substantially aqueous solvent and recovering said compound therefrom.

4. A method of preparing para-nitrobenzoyl-gamma-glutamylglutamic acid which comprises reacting gamma-ethyl para-nitrobenzoyl glutamate with hydrazine hydrate to form the corresponding hydrazide, reacting said hydrazide with nitrous acid to obtain the corresponding azide, reacting said azide with glutamic acid in an aqueous solvent, and recovering said para-nitrobenzoyl-gamma-glutamylglutamic acid therefrom.

5. A method of preparing gamma-ethyl para-nitrobenzoyl gamma-glutamyl-gamma-glutamylglutamate which comprises reacting gamma-ethyl para - nitrobenzoyl - gamma - glutamylglutamate with hydrazine hydrate to form the corresponding hydrazide, reacting said hydrazide with nitrous acid to obtain the corresponding azide, reacting said azide with gamma-ethyl glutamate in an aqueous solvent, and recovering said gamma-ethyl para-nitrobenzoyl - gamma - glutamyl - gamma-glutamylglutamate therefrom.

6. A method of preparing gamma-ethyl para-nitrobenzoyl-gamma - glutamylglutamate which comprises reacting gamma-ethyl para-nitrobenzoyl glutamate with hydrazine hydrate to form the corresponding hydrazide, reacting said hydrazide with nitrous acid to obtain the corresponding azide, reacting said azide with gamma-ethyl glutamate in an aqueous solvent, and recovering said gamma-ethyl para-nitrobenzoyl-gamma-glutamylglutamate therefrom.

JAMES H. BOOTHE.
ROBERT B. ANGIER.

REFERENCES CITED

The following references are of record in the file of this patent:

Schmidt, "The Chemistry of the Amino Acids and Proteins," C. C. Thomas Co., Springfield, Illinois (1938), pages 262–265 and 276.